UNITED STATES PATENT OFFICE.

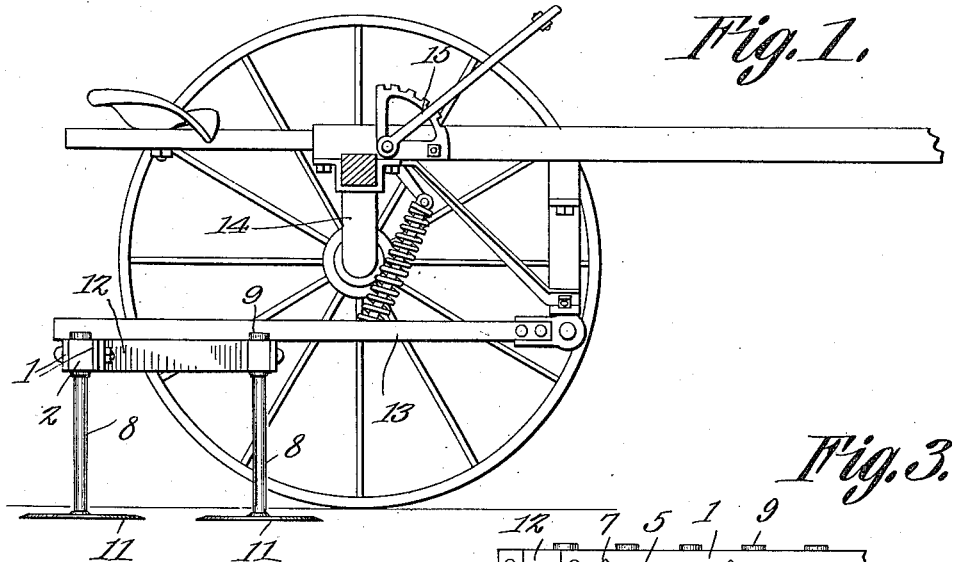
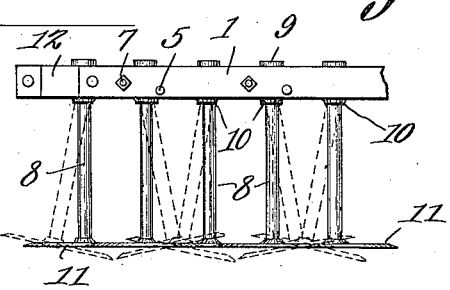
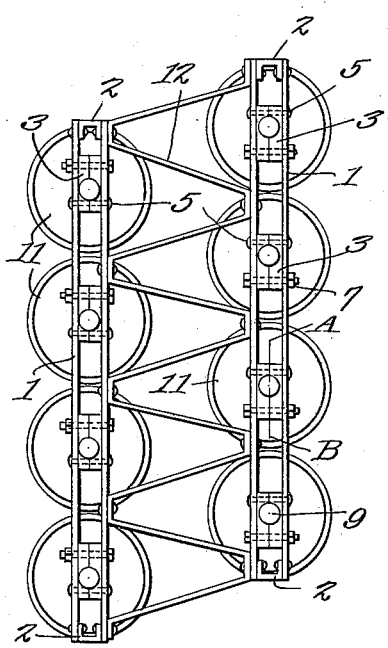
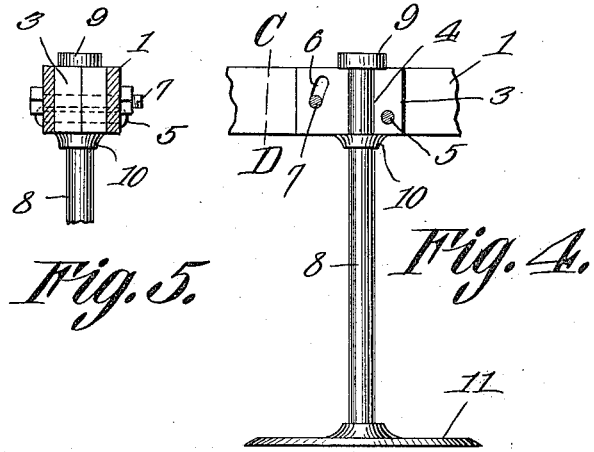

JAMES HOWARD ECCLES, OF LODI, CALIFORNIA.

COMBINED CULTIVATOR AND WEED-CUTTER.

1,158,906.        Specification of Letters Patent.        Patented Nov. 2, 1915.

Application filed December 11, 1914. Serial No. 876,711.

*To all whom it may concern:*

Be it known that I, JAMES H. ECCLES, a citizen of the United States, residing at Lodi, in the county of San Joaquin and State of California, have invented a new and useful Combined Cultivator and Weed-Cutter, of which the following is a specification.

This invention relates to weed cutters, its object being to provide a machine of this character utilizing disks adapted to be embedded entirely within the ground so as to cut under the surface of the ground, thus severing the roots of weeds and at the same time loosening the sub soil without materially disturbing the surface of the ground and without exposing the moist sub-soil to the air, which is extremely detrimental in the latter part of the season.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of a machine embodying the present improvements. Fig. 2 is a plan view of a gang of cutting disks. Fig. 3 is a front elevation of a portion of the gang. Fig. 4 is an enlarged section on line A—B Fig. 3. Fig. 5 is a section on line C—D Fig. 4.

Referring to the figures by characters of reference, 1 designates parallel beams spaced at their ends by interposed blocks 2 which may be riveted or otherwise secured to the beams. Secured between the beams 1 at regular intervals are pairs of gripping blocks 3 having grooves in their meeting faces which register to form an opening 4 for the purpose hereinafter set forth. Each pair of blocks is pivotally mounted upon a bolt 5 and each block of each pair has an arcuate slot 6 concentric with the pivot bolt. These slots 6 are designed to receive a clamping bolt 7 extending through the beams 1. The opening 4 formed by the registering grooves in the blocks 3 receives the upper end portion of a stem 8, said stem has a collar 9 at its upper extremity and another collar 10 at an intermediate point, these collars 9 and 10 being adapted to fit against the lower and upper faces respectively of the blocks 3. Secured to the lower end of the stem 8 is a cutting disk 11 of thin metal. It is to be understood that each pair of blocks 3 is provided with a stem 8 such as herein described and that any desired number of these blocks can be arranged in a row. Furthermore any desired number of rows of blocks can be employed. In the structure illustrated, two sets of beams 1 are employed, these sets being connected by a zigzag metal strap 12 forming a brace and connection.

The attachment herein described is designed to be used in connection with any form of cultivator. When so used it is employed in lieu of the usual soil engaging blade and is attached to the beams 13 extending under the arched axle 14 of the cultivator. Any mechanism desired and which has been shown generally at 15, can be employed for lifting the beam 13 and the parts connected thereto, thus to elevate the disks 11 simultaneously. Where two rows of disks 11 are used, the said disks are arranged in staggered relation, the disks of one row being located back of the spaces between the disks in the other row.

In using the structure herein described, the bolts 7 of one row are loosened and the blocks 3 are tilted upon their pivot bolt 5 so as to cause the stems 8 to incline, for example, to the right. The bolts 7 are then tightened, after which the bolts of the second row are loosened and the blocks 3 swung on their pivot bolt so as to cause the stem to incline, for example, to the left. Said bolts 7 are then tightened and the machine is ready for use. When the machine is drawn forward the beams 13 are lowered so as to bring the disks 11 below the surface of the ground. Then as the machine is drawn forward the tilted disks of the front row will be caused to roll through the soil without, however, disturbing the upper crust, and the same is likewise true of the rear disks. However, inasmuch as the disks of the front row are tilted oppositely to the disks of the rear row, the loosening action upon the sub-soil is greatly increased. By means of this arrangement of disks, the roots of weeds and the like are cut and the sub-soil is loosened, without, however, exposing it to the drying action of the air.

The top soil is only disturbed to the extent necessary to permit the passage of the thin stems 8 therethrough.

It is to be understood that the improvements herein described can be applied to a revolving harrow as readily as to a harrow of the type shown and described.

What is claimed is:—

1. An attachment for the shovel beams of a cultivator, including parallel beams adapted to extend under and be secured to said cultivator beams, a series of bearing boxes supported by said beams of the attachment and adjustable angularly about substantially horizontal axes, depending stems mounted for rotation within the boxes and supported thereby, and a flat cutting disk at the lower end of each stem.

2. An attachment for the shovel beams of a cultivator, including parallel beams disposed in pairs, rigid connections between said beams, said beams being adapted to be detachably connected to the shovel beams of the cultivator, and to extend transversely thereof, boxes supported by each pair of beams and adjustable angularly about substantially horizontal axes, means for holding the boxes against movement, stems mounted for rotation in and supported by the boxes, and a flat cutting disk at the lower end of and revoluble with each stem.

In testimony that I claim the foregoing as my own, I have hereto affixed my signature in the presence of two witnesses.

JAMES HOWARD ECCLES.

Witnesses:
F. A. DOUGHERTY.
RUTH E. DOUGHERTY.

Copies of this patent may be obtained for five cents each, by addressing the "Commissioner of Patents, Washington, D. C."